Patented Feb. 16, 1937

2,070,761

UNITED STATES PATENT OFFICE 2,070,761

PROCESS FOR THE PRODUCTION OF MERCAPTANS

Lajos von Szeszich, Frankfort-on-the-Main, Germany, assignor to Deutsche Gold- und Silber Scheideanstalt, Frankfort-on-the-Main, Germany No Drawing. Application March 19, 1936, Serial No. 69,721. In Germany March 19, 1935

9 Claims. (Cl. 260—156)

The present invention relates to the production of mercaptans and similar organic sulphur compounds.

Heretofore mercaptans, thio-ethers, di-sulphides and similar organic sulphur compounds have been produced in various manners. One known process obtains such compounds from alcohols through the formation of the alkyl halogenides. Mercaptans may also be obtained by treating olefines at high temperatures with hydrogen sulphide and other materials. Also, such compounds have been produced by treating alcohols at high temperatures with hydrogen sulphide in the presence of catalysts.

Such earlier procedures have not been very satisfactory as they are difficult to control and expensive, and this is particularly true in the production of the higher mercaptans and thio-ethers.

I have discovered that mercaptans can be produced by the treatment of certain types of organic acids, particularly carboxylic acids, with hydrogen sulphide and hydrogen in the presence of hydrogenation catalysts. Very good yields can be obtained in this manner. Furthermore, instead of free acids similar results may be obtained by the use of other organic compounds which contain carboxylic groups, and particularly organic compounds which can be hydrolyzed to carboxylic acids, such as esters, salts and ester-like compounds. The process results in the production, in addition to mercaptans, of other organic compounds such as thio-ethers, di-sulphides and the like.

The formation of mercaptans from acids proceeds according to the following general formula, in which R represents any element or aliphatic or cyclic radical capable of forming a carboxylic acid of the type indicated:

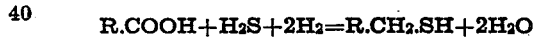

R.COOH+H₂S+2H₂=R.CH₂.SH+2H₂O

Where esters, salts or the like are being used as starting materials, the production takes place substantially according to the following formula, in which R₁ and R₂ represent any elements or radicals capable of forming carboxylic compounds of this nature:

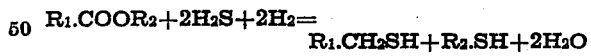

R₁.COOR₂+2H₂S+2H₂=
R₁.CH₂SH+R₂.SH+2H₂O

The reaction takes place at temperatures between 150° C. and 400° C., and is particularly effective between 250° C. and 350° C. Furthermore, the yield is increased when the treatment is carried out at increased pressures, preferably at pressures between 50 and 500 atmospheres. However, the invention is not limited as to pressures inasmuch as good yields may be obtained even at atmospheric or sub-atmospheric pressures.

Instead of using hydrogen sulphide, any other substance may be used which will form hydrogen sulphide under the reaction conditions. Such compounds as elemental sulphur, carbon disulphide, calcium sulphide, ammonium sulphide or even sodium sulphide are useful. The hydrogen sulphide and hydrogen should preferably be present in excess of the theoretical amounts required to produce complete conversion of the carboxylic compound to a mercaptan, for example in amounts at least twice the theoretical amounts.

While any hydrogenation catalyst is useful in the process, metal-sulphur compounds have been found to be especially effective. This is particularly true of the sulphides of the heavy metals of the first, sixth and eighth groups of the periodic system. The sulphide catalysts for use in the process may be produced in any manner. They may either be placed in the reaction vessel before the process starts, or they may be formed in the reaction vessel before or at the beginning of the reaction. For example, by the introduction of suitable metal compounds into the vessel together with sulphur and/or hydrogen sulphide, the catalyst may be formed therein in situ. This may take place either before the reaction starts or at the beginning of the reaction through the action of the hydrogen sulphide which is present in the carrying out of the process. Particularly good results are obtained by an intensive sulphurization of the catalyst materials. For instance, a molybdenum sulphide catalyst obtained by precipitation with hydrogen sulphide from a concentrated ammoniacal ammonium-molybdate solution, which thus comprises a polysulphide, is especially effective.

The metal-sulphur catalysts may be used alone or with vehicles or carriers. They may be arranged in the catalyzing vessel beforehand or introduced into the reaction vessel with the starting materials. Carrier materials may be used which have some influence towards increasing the catalytic activity.

It is also possible, instead of treating the raw materials continuously with hydrogen sulphide and hydrogen, to treat them intermittently with such materials.

My invention will be made clear from the following examples describing various modes of carrying out the invention.

Example I 300 grams of ethyl propionate are heated with 5% of molybdic acid and 20% of sulphur in a rotating autoclave of 4.5 liters capacity for three hours at 300° C. Enough hydrogen is introduced at the beginning of the process to produce a pressure of 100 atmospheres. When the autoclave is cooled after the heating, the pressure is 50 atmospheres. With relation to the quantity of starting material, there is obtained from the autoclave 58.6% oily substances and 23.3% water. The product contains 10.25% mercaptan calculated as sulphur, which corresponds to a yield of 12.9% of a mixture of ethyl and propyl mercaptans.

Example II

Commercial oleic acid is passed at a pressure of 200 atmospheres with hydrogen and hydrogen sulphide in excess of the theoretical amounts over a catalyst consisting of a carrier of clay impregnated with a catalytically acting metal salt such as a metal sulphide. Different catalysts yield products of varying mercaptan content, as is shown by the following table:

| Catalyst (salt of) | Reaction temperature °C. | Percent mercaptans in product |
|---|---|---|
| Mo | 275 | 22.5 |
| W | 275 | 9.6 |
| Co | 250 | 8.7 |
| Cu | 275 | 1.6 |

Example III

Commercial oleic acid is passed at different temperatures and pressures, as indicated by the table below, in admixture with hydrogen and carbon disulphide over a catalyst which is fixed in the reaction receptacle. The catalyst is produced by mixing ammonium sulpho-molybdate with silica gel. 3000 liters of hydrogen and 300 cubic meters of carbon disulphide are used for each kilogram of oleic acid. The reaction obtained is 98% to 99% complete. Depending on the temperature and pressure, the following percentages of mercaptan, consisting of a mixture of octadecyl and octadecylene mercaptans, are obtained:

| Reaction temp. °C. | 100 atm. | 200 atm. | 300 atm. |
|---|---|---|---|
| 225 | 4.1 | 12.7 | 11.0 |
| 250 | 29.0 | 40.0 | 53.7 |
| 275 | 23.0 | 43.5 | 51.4 |

In Examples 4 to 6 to be described below, different starting materials were treated at carying temperatures and at 300 atmospheres initial pressure with hydrogen and carbon disulphide, in amounts substantially twice the theoretical, by passing the mixture over a catalyst consisting of ammonium sulpho-molybdate and silicic acid having a content of about 10% molybdenum.

Example IV

| Stearic acid | Acid count 242 | Saponification count 268 | |
|---|---|---|---|
| Reaction temperature °C. | Mercaptans in products | Saponification count of products | Total S in percent |
| 325 | 15.2 | 39 | 3.30 |
| 300 | 33.5 | 87 | 6.65 |
| 275 | 23.1 | 175 | 4.90 |
| 250 | 10.2 | 223 | 1.90 |

Example V

| Naphthenic acid | Acid count 238 | Saponification count 267, specific gravity 1.15 | |
|---|---|---|---|
| Reaction temperature °C. | Mercaptans in products | Saponification count of products | Total S in percent |
| 325 | 1.1 | 36 | 0.54 |
| 300 | 18.0 | 190 | 4.4 |
| 275 | 40.5 | 212 | |
| 250 | 14.5 | 244 | |

Example VI

| Olive oil | Ester count 216 | Specific gravity 0.915 | |
|---|---|---|---|
| Reaction temperature °C. | Mercaptans in products | Saponification count of products | Total S in percent |
| 325 | 0.9 | 54 | 0.50 |
| 300 | 15.2 | 58 | 4.20 |
| 275 | 16.2 | 112 | 5.53 |
| 250 | 5.7 | | 2.22 |

Example VII

Stearic acid is passed with hydrogen and carbon disulphide at 250 atmospheres and 250° C. over a catalyst consisting of ammonium sulphomolybdate and silica gel. The product contains 10% mercaptan calculated as sulphur and 10.6% total sulphur, and has an acid count of 14.

While I have described herein some embodiments of my invention, I wish it to be understood that I do not intend to limit myself thereby except within the scope of the appended claims.

I claim:

1. Process for producing mercaptans, which comprises reacting a substance, selected from the group consisting of carboxylic acids and compounds which are hydrolyzable to carboxylic acids, with hydrogen and a substance selected from the group consisting of hydrogen sulphide and materials which yield hydrogen sulphide under the reaction conditions, in the presence of a hydrogenation catalyst, at a temperature of between 150° C. and 400° C.

2. A process as claimed in claim 1, in which the reaction takes place at a pressure of from 50 to 500 atmospheres.

3. A process as claimed in claim 1 in which said catalyst is selected from the sulphides of the heavy metals of the sixth group of the periodic system.

4. A process as claimed in claim 1, in which said catalyst is a sulphide which is formed in situ.

5. Process for producing mercaptans, which comprises reacting a carboxylic acid with hydrogen and a substance selected from the group consisting of hydrogen sulphide and materials which yield hydrogen sulphide under the reaction conditions, in the presence of a hydrogenation catalyst, at a temperature of between 150° C. and 400° C.

6. Process for producing mercaptans, which comprises reacting a substance, selected from the group consisting of carboxylic acids and compounds which are hydrolyzable to carboxylic acids, with hydrogen and a substance selected from the group consisting of hydrogen sulphide and materials which yield hydrogen sulphide under the reaction conditions, in the presence of a hydrogenation catalyst, at a temperature of between 250° C. and 350° C.

7. A process for producing mercaptans, which comprises introducing into a reaction chamber a carboxylic compound, sulphur, hydrogen sulphide and a hydrogenation catalyst, subjecting the resulting mixture to pressure, and heating the mixture to a temperature of 150° C. to 400° C.

8. A process as claimed in claim 1, in which said catalyst comprises a carrier and a catalytic material carried thereby.

9. Process for producing mercaptans, which comprises reacting a compound containing a carboxylic group with hydrogen and a substance selected from the group consisting of hydrogen sulphide and materials which yield hydrogen sulphide under the reaction conditions, in the presence of a hydrogenation catalyst, at a temperature of between 150° C. and 400° C.

LAJOS von SZESZICH.